Patented Apr. 22, 1941

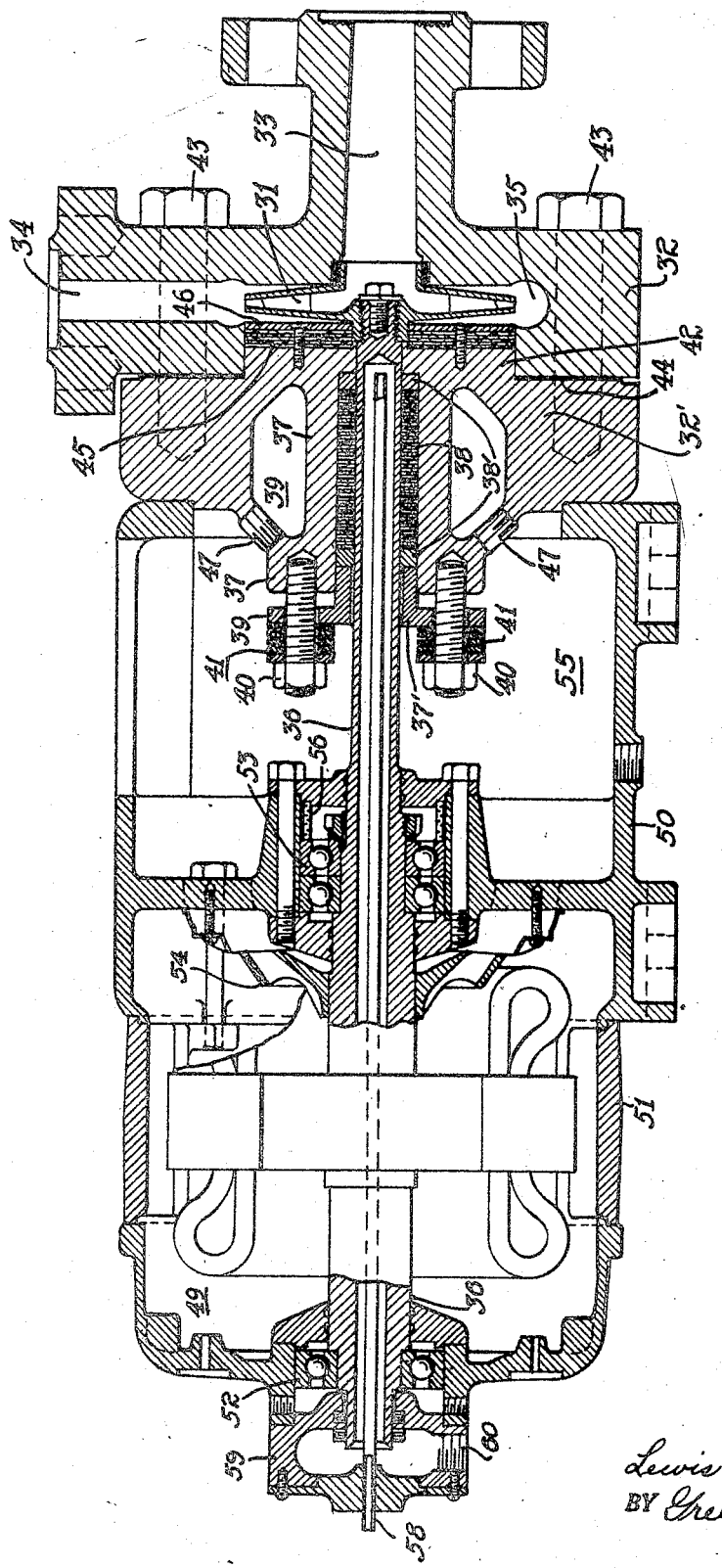

2,239,228

UNITED STATES PATENT OFFICE 2,239,228

PUMP MECHANISM

Lewis E. Hankison, Dormont, Pa.

Application January 21, 1938, Serial No. 186,092

3 Claims. (Cl. 103—114)

This invention relates broadly to pump mechanisms and has for an object to produce such a pump which is capable of being effectively employed in the pumping of a high pressure, high temperature liquid such as the boiler water of modern steam generating apparatus.

A further object is to produce a simple, compact pump mechanism which may be effectively employed in pumping high pressure, high temperature liquids from one receptacle to another and which obviates difficulties ordinarily encountered in packing the pump shaft of such pump mechanisms.

These and other objects, which will be made more apparent throughout the further description of the invention, are attained by means of a pump mechanism embodying the features herein described and illustrated.

In the drawing accompanying and forming a part hereof, the figure is a longitudinal vertical elevation of a pump mechanism embodying my invention.

One of the principal objects of the present invention is to provide a pump for transferring high pressure, high temperature liquid from one receptacle to another and in which means are employed for conserving the heat of the pumped liquid and at the same time insulating at least a portion of the pump casing from the heat of such liquid. In the illustrated embodiment of the invention, this is accomplished by providing a sectional casing in which one casing part carries a packing gland for the pump shaft and is so insulated from the pump chamber and the adjacent casing part as to conserve the heat of the pumped liquid and also minimize the transfer of heat from such liquid to the packing for the pump shaft.

The pump proper here illustrated as constituting an embodiment of my invention, includes a rotor or runner 31 enclosed within a sectional casing 32, 32' so arranged that one part 32 approximates a removable cover but is provided with an inlet passage 33 and an outlet passage 34. The passage 33 is axially aligned with the rotor 31 and is appropriately flanged at its outer end for the purpose of facilitating connecting it to an inlet pipe such as the piping 21 of the figure. The passage 34 occupies the usual position with relation to the pump runner 31 and as shown in the drawing extends at right angles to the passage 33 and is flanged at its outlet end for facilitating connection to a delivery pipe, such as the pipe 22 of the figure. With the arrangement of passages just described it will also be apparent that the volute chamber 35 is formed wholly within the cover part 32.

The pump runner 31 is mounted on a driven shaft 36, which is shown as hollow and as constituting an extension of the motor shaft. This shaft projects through a suitably positioned aperture so formed in the casing part 32' as to constitute a stuffing box 37 adapted to receive the usual form of shaft packing 38. As shown, the casing part 32' is provided with an annular chamber 39, which surrounds the portion of the casing part constituting the stuffing box 37 and this box is adapted to receive a packing gland 37', which is secured in place by means of studs and nuts 40. As shown, each nut 40 engages a coil spring 41 which surrounds the associated stud and which acts between the nut and the gland 37' so that the gland is held in place against the packing by the pressure of the various springs 41. As illustrated, the gland 37' engages a metal ring 38' which loosely surrounds the shaft 36 and transmits the pressure of the gland to the packing material. A similar metal ring 38' is located at the other end of the assembly of packing material.

While the volute 35 is formed wholly within the casing part 32 the chamber within which the runner 31 rotates is formed by the cooperation of the two casing parts 32 and 32'. As shown, the part 32' is, in effect, provided with a cylindrical extension 42 so formed that it projects into a corresponding cylindrical opening formed in the part 32. The extension 42 is surrounded by an annular shoulder which constitutes a positioning abutment for the casing part 32 to which the casing part 32' is secured by bolts 43. The packing 44 for the casing joint is located between this annular shoulder and the adjacent portion of the casing part 32. In view of the fact that the pump 20 is adapted to operate on highly heated water I have taken precautions to minimize the flow of heat from the pump chamber into the cover part 32' and I have also provided means for rapidly dissipating such heat as is delivered to such part and also such heat as may be mechanically generated in or adjacent to the stuffing box 37 by the rotation of the shaft 36. It will, therefore, be noted that the packing 44 is such and is so installed between the casing parts that it has some effect in resisting heat flow into the casing part 32'.

I have also provided a flat circular packing 45 which, together with its holding plate 46, forms a continuation of the extension 42 and may act, at its peripheral edge, as a seal for the joint between the two part casing. The principal function of this packing 45, however, is to resist the flow of heat from the pump chamber into the cover part 32'. The plate 46 forms a lateral wall of the pump chamber and is held in place on the casing part 32' by suitable attaching means such as the screws illustrated. The packing material 45 must be carefully selected because of the temperature and chemical conditions encountered within the pump chamber, i. e., it must be capable of resisting both conditions and at the same time function to cut down the flow of heat from that chamber and into the cover part 32'. I have found that a packing having a highly refractory ceramic base with its pores impregnated with coke or coke-like material has the required characteristics, and such material is manufactured commercially under the name Kemite.

It is, of course, apparent that some heat will be transmitted to the casing part 32' and that some heat will be generated within the stuffing box 37. I, therefore, contemplate circulating a cooling medium, such as cooling water, through the chamber 39 and for this reason have provided that chamber with two ports 47, tapped to receive pipe connections. I also contemplate circulating a cooling medium, through the shaft 36 as will hereinafter be more fully described.

In the drawing, I have shown the pump as a part of an assembled unit which includes an electric motor 49 of usual construction except that the shaft 36 thereof is a hollow shaft. I have also provided a special two part cover for the motor which includes the portion 50 which in effect constitutes a base for the assembly and provides the means for securing the motor and the pump together. The motor cover part 51 cooperates with the part 50 and the bearings for the motor shaft 36 are provided in this two part cover. The end bearing 52 is shown as a ball bearing and is of usual construction. The intermediate bearing 53 is also shown as a ball bearing but one in which a double race is employed. This bearing is in reality carried by the base 50 and is of such proportions and so designed that it constitutes a thrust as well as a rotary bearing. It takes up such end thrust as is imparted to the shaft 36 by the operation of the pump and the pressure conditions within the pump chamber.

The motor 49 is provided with a usual form of ventilating fan 54, which is carried by the shaft 36 and which delivers into vent apertures leading into the open chamber 55 formed within the standard or base portion 50. In assembling the double race bearing 53 I have found it convenient to employ a spacer ring 56 having spring-like characteristics. It will, of course, be apparent that the outer races of the bearing 53 are carried by a rigid strut, forming a part of the base or standard 50, and that they must be accurately positioned and be rigidly held in place during operation. The spring-like ring 56 facilitates the positioning of these races and also operates to hold them in the desired relationship with each other.

It will be noted that the pump runner 31 is mounted on an overhung portion of the shaft 36 but the runner and the shaft are so formed with relation to the casing part 32' that the stuffing box and the cover part 32' provide what may be termed steadying bearings for the overhanging end of the pump shaft. For this reason the bearing 53 is termed an intermediate bearing.

In the apparatus illustrated cooling liquid is delivered to the interior of the shaft 36 through a liquid inlet pipe 58 which is of less diameter than the internal bore of the shaft 36 and is located axially with relation to that shaft and therefore provides both an inlet and an outlet passage for cooling medium. A liquid discharge box 59 is carried by the end of the motor cover 51 in such a position that it surrounds the open end of the hollow shaft 36 and provides a discharge chamber for the liquid issuing therefrom. This chamber is in turn provided with a discharge port 60 which is suitably tapped and adapted to be connected to discharge piping which may communicate with a sump or a reservoir to which the cooling medium may be delivered for recirculation.

While I have illustrated and described but one embodiment of the apparatus constituting my invention, it will be apparent that various changes, additions and omissions may be made therein, without departing from the spirit and scope of my invention as defined by the appended claims.

What I claim is:

1. In combination in a pump, a pump runner, a sectional pump casing enclosing said runner, one casing part having the pump chamber and the entire volute formed therein and provided with a centrally disposed inlet port and a peripherally disposed outlet port and a second casing part projecting into and constituting a closure for a lateral aperture formed in the first-mentioned casing part, a drive shaft for said runner projecting through an aperture formed in said second casing part, a shaft packing for said shaft located within said aperture, a heat insulating packing located within said pump chamber, secured to said second casing part and positioned so as to retard the flow of heat from said pump chamber to said shaft packing and means for cooling said shaft packing.

2. In combination in a pump, a pump runner, a sectional pump casing enclosing said runner, one casing part having the pump chamber and the entire volute formed therein and provided with a centrally disposed inlet port, a peripherally disposed outlet port and a lateral pump-runner-receiving aperture located opposite to said inlet port and a second casing part having a lateral extension adapted to project into said lateral aperture, a drive shaft on which said runner is mounted projecting through an aperture formed in said second casing part, a shaft packing for said shaft located within said aperture, means for circulating cooling fluid through a chamber formed in said second casing part and surrounding said packing, and a heat insulating packing located within said pump chamber secured to said second casing part and so positioned as to retard the flow of heat from said pump chamber to said second casing part and said shaft packing.

3. In combination in a pump, a pump runner, a pump casing formed in parts and enclosing said runner, one casing part having the pump chamber, a centrally disposed inlet port and a peripherally disposed outlet port formed therein, and having a laterally disposed pump-runner-receiving aperture located opposite to said inlet port, a second casing part projecting into and constituting a closure for said lateral aperture, a drive shaft on which said pump runner is mounted projecting through an aperture formed in the second casing part, a shaft packing for said shaft carried by said second casing part, means for cooling said shaft packing and means for retarding the flow of heat from the first-mentioned casing part to the second casing part constituting a heat insulating packing located in the pump chamber, secured to said second casing part, and positioned so as to retard heat flow from said pump chamber to said second casing part and said shaft packing.

LEWIS E. HANKISON.